(12) United States Patent
Asbach et al.

(10) Patent No.: US 7,967,089 B2
(45) Date of Patent: Jun. 28, 2011

(54) CHILDREN'S RIDE-ON VEHICLES WITH POWERED WINDOW MECHANISMS

(75) Inventors: Ronald M. Asbach, Grand Island, NY (US); David M. Bapst, South Wales, NY (US); Kurt J. Huntsberger, Arcade, NY (US); Jacob J. Clark, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 1099 days.

(21) Appl. No.: 11/789,780

(22) Filed: Apr. 24, 2007

(65) Prior Publication Data

US 2008/0264703 A1    Oct. 30, 2008

(51) Int. Cl.
    *B60K 1/00*    (2006.01)
(52) U.S. Cl. .......................................... 180/65.1; 49/348
(58) Field of Classification Search .................. 180/65.1, 180/65.31; 49/348, 349, 350, 360, 361, 362
    See application file for complete search history.

(56) References Cited

U.S. PATENT DOCUMENTS

| | | | | |
|---|---|---|---|---|
| 4,222,202 A * | 9/1980 | Pigeon | ............................ | 49/352 |
| 4,939,867 A | 7/1990 | Harada et al. | | |
| 4,967,510 A | 11/1990 | Torii et al. | | |
| 5,076,014 A * | 12/1991 | Cuyl | ............................... | 49/140 |
| 5,080,272 A | 1/1992 | Buschmann et al. | | |
| 5,309,677 A | 5/1994 | Kunert et al. | | |
| 5,309,678 A * | 5/1994 | Adachi | ........................... | 49/352 |
| 5,505,022 A * | 4/1996 | Shibata et al. | .................. | 49/352 |
| 5,657,580 A * | 8/1997 | Kobrehel | ......................... | 49/352 |
| 5,799,441 A * | 9/1998 | Shibata | ........................... | 49/352 |
| 6,006,473 A * | 12/1999 | Mariel et al. | ..................... | 49/139 |
| 6,061,963 A * | 5/2000 | Osborn et al. | ................... | 49/352 |
| 6,119,400 A * | 9/2000 | Ovenshire | ........................ | 49/352 |
| 6,216,394 B1 | 4/2001 | Fenelon | | |
| 6,389,753 B1* | 5/2002 | Fenelon | ........................... | 49/348 |
| 6,430,874 B1 | 8/2002 | Korte | | |
| 6,560,929 B1 | 5/2003 | Staser et al. | | |
| 6,779,307 B2* | 8/2004 | Dobson | ........................... | 49/349 |
| 7,726,074 B2* | 6/2010 | Kollner et al. | .................. | 49/352 |
| 2002/0104695 A1 | 8/2002 | Sitarski et al. | | |
| 2002/0162280 A1* | 11/2002 | Shah | ................................ | 49/352 |
| 2004/0003544 A1 | 1/2004 | Berry et al. | | |
| 2004/0111970 A1 | 6/2004 | Fenelon | | |
| 2005/0160675 A1 | 7/2005 | Fenelon | | |
| 2005/0287923 A1 | 12/2005 | Haney | | |
| 2005/0287924 A1 | 12/2005 | Haney | | |
| 2006/0064934 A1 | 3/2006 | Vornbaumen et al. | | |
| 2009/0145034 A1* | 6/2009 | Isomura | ........................... | 49/349 |

OTHER PUBLICATIONS

International Search Report and Written Opinion for Application No. PCT/US08/60122.

* cited by examiner

*Primary Examiner* — Jeffrey J Restifo
(74) *Attorney, Agent, or Firm* — Dascenzo Intellectual Property Law, P.C.

(57) ABSTRACT

Children's ride-on vehicles having powered window mechanisms, and window mechanisms for such vehicles. The window mechanism includes a window drive assembly that selectively drives movement of a window member relative to the vehicle body. In some embodiments, the window drive assembly includes a window motor assembly and a window linkage to couple the output of the window motor assembly to the window member. In some embodiments, the window member includes a receiving region coupled to the window linkage. In some embodiments, the window mechanism includes a window support assembly that maintains the window member in a predetermined orientation relative to the vehicle body.

29 Claims, 7 Drawing Sheets

CHILDREN'S RIDE-ON VEHICLES WITH POWERED WINDOW MECHANISMS

TECHNICAL FIELD

The present disclosure relates generally to children's ride-on vehicles, and more particularly to battery-powered children's ride-on vehicles with powered window mechanisms.

BACKGROUND OF THE DISCLOSURE

Children's ride-on vehicles are reduced-scale vehicles that are designed for use by children. For example, children's ride-on vehicles include at least one seat adapted to accommodate one or more children and steering and drive assemblies that are adapted to be operated by a child sitting on the seat. One type of drive assembly that is often used in children's ride-on vehicles includes a battery-powered vehicle motor assembly that is adapted to drive the rotation of one or more of the vehicle's wheels, such as responsive to inputs from the child sitting on the seat. The vehicle motor assembly is powered by a battery assembly, which may include one or more rechargeable batteries. Typically, the vehicle will include an actuator, such as a foot pedal, push button, or other user input device, which enables a child to select when power is delivered to the vehicle motor assembly. Some vehicle drive assemblies further include other user input devices, such as a speed selector and/or a direction selector, which are operated by a child sitting on the vehicle's seat to select the speed and direction at which the vehicle travels.

Children enjoy imitating adult activities and consequently enjoy ride-on vehicles that resemble full-scale vehicles, including full-scale vehicle functionality. However, conventional children's ride-on vehicles lack windows, much less movable windows that more closely resemble full-scale vehicles.

DETAILED DESCRIPTION AND BEST MODE OF THE DISCLOSURE

Figure 1:
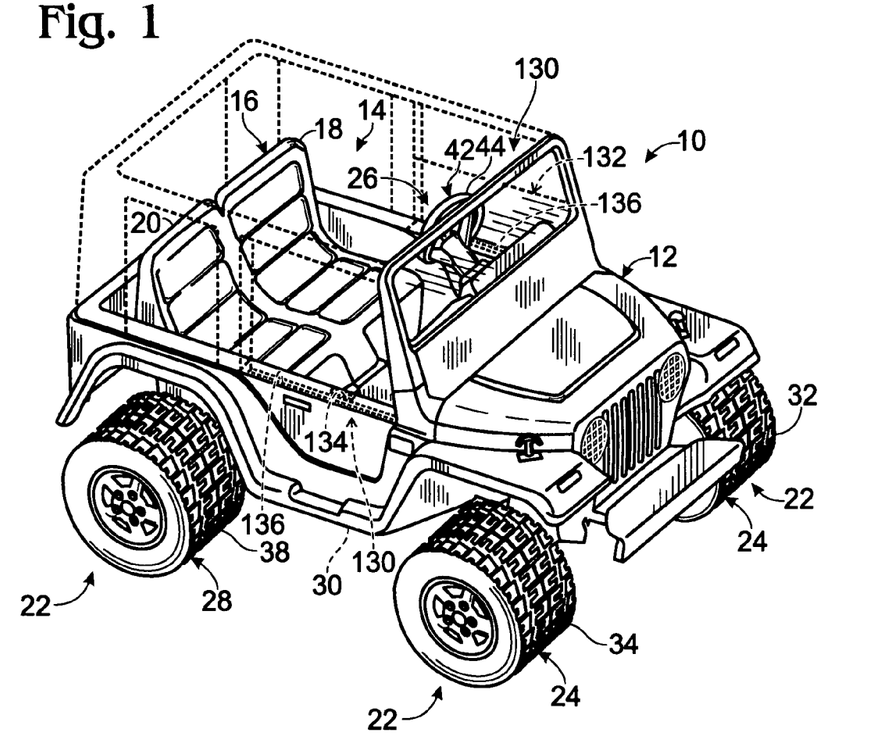
FIG. 1 is an isometric view of an illustrative, non-exclusive example of a children's ride-on vehicle according to the present disclosure, with the vehicle including a powered window mechanism for moving a window member relative to a vehicle body.

An illustrative, non-exclusive example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips, and/or other suitable fasteners. Body 12 may additionally, or alternatively, be at least partially formed from other suitable material(s), such as metal, wood, and/or composite materials. Body 12 may include, or be mounted upon, an underlying chassis, or chassis portion, on which the rest of the body (which may be referred to as a body portion) is supported. The chassis portion may be formed from the same or different materials as the rest of the body. When present, the chassis portion is often formed of metal and/or molded plastic, with the rest of the body often being formed of molded plastic. However, these illustrative examples of suitable materials of construction are not required.

As shown, body 12 is shaped to generally resemble a reduced-scale Jeep® vehicle. JEEP is a registered trademark of the Daimler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft, and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10, including the subsequently described powered window mechanisms, may be configured for use on any type of children's ride-on vehicle having one or more powered components.

Figure 2:
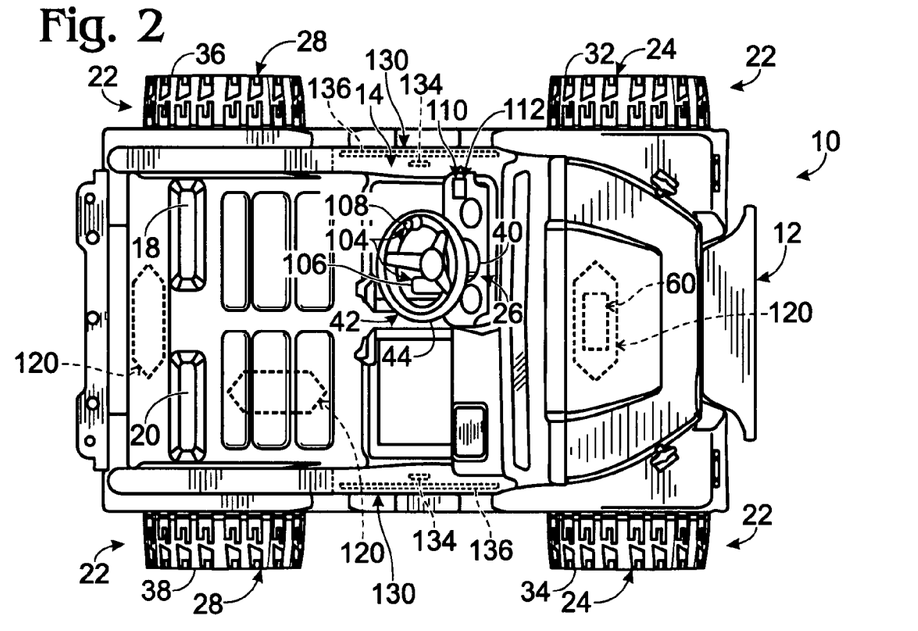
FIG. 2 is a top plan view of the vehicle of FIG. 1.

Ride-on vehicle 10 also includes a plurality of wheels 22 that are rotatably coupled to body 12 and adapted to contact a ground surface, as indicated in FIGS. 1-2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of the motor assembly or conveyed through a linkage, such as a gearbox, belt, chain, gear assembly, axle, or the like.

In the illustrated, non-exclusive example, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels, although children's ride-on vehicles typically include at least three wheels for stability. Similarly, each wheel assembly must contain at least one wheel of the plurality of wheels, and a particular wheel may form all or a portion of the steerable wheel assembly and/or the driven wheel assembly. For example, it is within the scope of the disclosure that either or both of front wheels 32 and 34 or rear wheels 36 and 38 are driven and/or steerable. Similarly, one front wheel and one rear wheel may be driven and/or steerable. Additionally or alternatively, the vehicle may include one or more driven and/or steerable wheels underneath its body that are generally hidden by, or housed within, the body of the vehicle.

A portion of the vehicle's steering assembly 26 is shown in FIGS. 1 and 2 and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers, may be used and are within the scope of the present disclosure. Steering column 40 includes any suitable mechanical linkage that conveys a child's steering inputs from the steering mechanism to the vehicle's steerable wheel assembly, thereby steering the vehicle. As an illustrative, non-exclusive example, the steering column may include an end portion distal the steering mechanism, with this end portion being coupled via a suitable tie rod or steering linkage, to steering collars, or steering levers, associated with one or more steerable wheels of the ride-on vehicle's steerable wheel assembly.

Figures 3, 4:
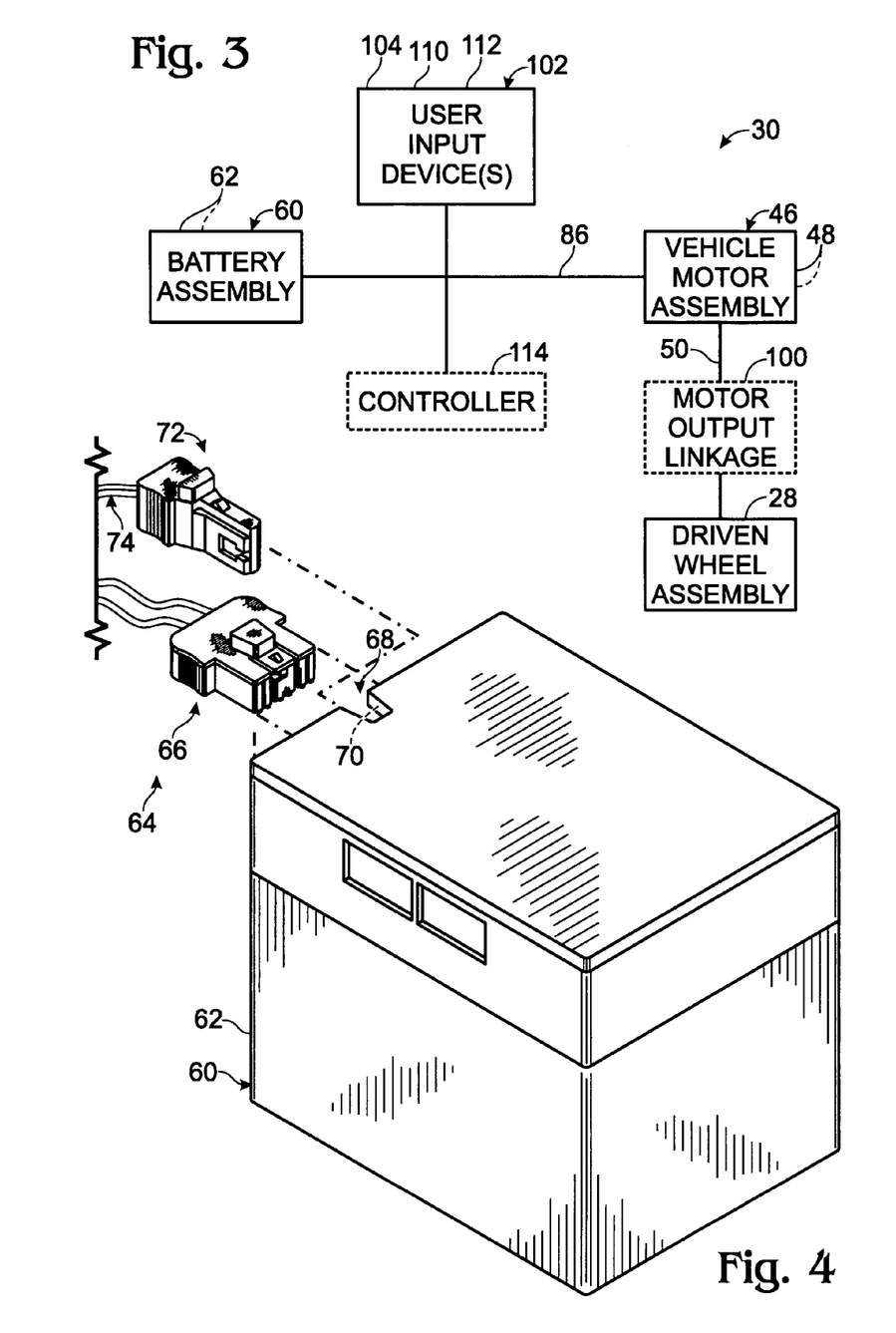
FIG. 3 is a schematic diagram of a suitable drive assembly for a children's ride-on vehicle according to the present disclosure, such as the vehicle of FIG. 1.
FIG. 4 is a perspective view of an illustrative example of a battery assembly suitable for use with the vehicle drive assembly of FIG. 1, with portions of the vehicle's wiring harness and charger shown in fragment.

In FIG. 3, a non-exclusive example of a suitable vehicle drive assembly 30 for a children's ride-on vehicle, such as vehicle 10, is schematically illustrated. Vehicle drive assembly 30 is adapted to drive the rotation of driven wheel assembly 28. The vehicle drive assembly includes a vehicle motor assembly 46, which includes at least one electric motor 48 that is adapted to drive the rotation of at least one of the driven wheels of the plurality of wheels. The vehicle motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when vehicle motor assembly 46 includes more than one motor and/or when driven wheel assembly 28 includes more than one driven wheel. Illustrative, non-exclusive examples of suitable motors are disclosed in U.S. Patent Application Publication No. 2006/0175101, the complete disclosure of which is hereby incorporated by reference for all purposes. Vehicle motor assembly 46 also may be configured to drive other moveable components on vehicle 10, such as depending on the form of the vehicle. For example, the vehicle motor assembly may be coupled to raise and lower the blade of a ride-on that resembles a bulldozer, the bucket of a ride-on that resembles a skid-steer or other loader, the bed of a ride-on that resembles a dump truck, etc.

Power for the vehicle motor assembly is provided by any suitable power source. An illustrative example of a suitable power source is a battery assembly 60. Battery assembly 60 includes at least one battery 62 that is adapted to provide power to the vehicle motor assembly. Any suitable type and number of batteries may be used in battery assembly 60. Although not required, the batteries may be rechargeable batteries. For example, one or more six-, twelve-, eighteen-, or twenty-four-volt batteries have proven effective. An illustrative example of a battery assembly 60 is shown in FIG. 4. Also shown in FIG. 4 is a connector assembly 64 that is adapted to transmit power from the battery assembly to the vehicle motor assembly by providing an electrical connection between the battery assembly and the vehicle motor assembly, typically through the vehicle's wiring harness. Thus, the vehicle motor assembly is operably connected to the battery assembly by any suitable electrical connectors, such as cables, wires, or positive and negative terminals or leads, and the like.

In the illustrative battery assembly shown generally in FIG. 4, the connector assembly includes a plug 66 that fits into a socket 68 that is electrically connected to the battery assembly. The battery assembly 60 may optionally include a charging jack 70 that is configured to receive a charging probe 72. The plug and probe connect to wires, or electrical cables, 74 that transmit electrical power from the battery assembly to the motor assembly. It is within the scope of the present disclosure that vehicle 10 may include any other suitable structure for conducting electrical power from the battery assembly to the motor assembly, with the battery assembly of FIG. 4 merely providing an illustrative example. For example, the battery assembly may include one or more batteries that include a connector that extends, typically via a wired connection, from the battery's housing instead of the internal socket 68 depicted in FIG. 4. Illustrative, non-exclusive examples of suitable batteries for children's ride-on vehicles are disclosed in U.S. Pat. No. 6,509,719, the complete disclosure of which is hereby incorporated by reference for all purposes.

In FIG. 3, vehicle drive assembly 30 is shown further including an optional motor output linkage 100 that mechanically interconnects the vehicle motor assembly with the driven wheel assembly. Motor output linkage 100 is any suitable mechanism that transmits the rotational input from the vehicle motor assembly's output(s) to the driven wheel assembly. Examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the vehicle motor assembly to the driven wheel assembly at the same relative rate of rotation, or it may mechanically augment the rotational input to convey a greater or lesser rate of rotation relative to the rate of rotation of the output of the vehicle motor assembly. It is also within the scope of the disclosure that vehicle drive assembly 30 may be formed without motor output linkage 100, in which case the output(s) 50 of the vehicle motor assembly directly transmits the rotational input to the driven wheel assembly.

Vehicle drive assembly 30 also includes one or more user input devices 102 that are adapted to convey inputs from a child sitting on the vehicle's seat, such as seat 18, to the vehicle drive assembly. User input devices 102 also may be referred to as user control devices. These devices convey a user's inputs, such as via the vehicle's wiring harness 86. An illustrative example of a user input device is a drive actuator 104, which is adapted to selectively energize the vehicle motor assembly responsive to a user, such as a child sitting on the vehicle's seat, manipulating, or otherwise actuating the input device. In other words, drive actuator 104 is adapted to receive a user input directing the battery assembly to actuate or otherwise energize the vehicle motor assembly, such as to cause the ride-on vehicle to be in an energized drive configuration instead of a de-energized drive configuration. Illustrative examples of suitable drive actuators 104 include an on/off switch, a foot pedal, a throttle lever, and a rotational handgrip on a steering mechanism that includes a handlebar.

In FIG. 2, an example of a drive actuator 104 is shown in the form of a foot pedal 106 positioned for actuation by a child sitting on seat 18. When the drive actuator takes a form other than a foot pedal, it may be located in any suitable location within or near passenger compartment 14 so that a child sitting on seat 18 may reach the actuator while positioned to operate the vehicle. For example, an on/off switch or throttle may be located on the body or on the steering mechanism, such as illustrated at 108 in FIG. 2. Although a pair of drive actuators is illustrated in FIG. 2, the vehicle drive assembly will often only include a single drive actuator. The drive actuators may enable a user to select within a range of actuations/speeds (such as with a throttle), or simply to select whether or not the vehicle motor assembly is energized, such as with an on/off switch.

The user inputs, such as conveyed via user input device(s) 102, also may be adapted to select, or configure, the vehicle drive assembly within a plurality of drive configurations. These user inputs may be referred to as configuration inputs and are adapted to enable, or select, one or more of a plurality of drive configurations. Similarly, the user input devices utilized to receive the configuration inputs from a user, such as a child sitting on the ride-on vehicle's seat, may be referred to as configuration input devices. These drive configurations may be realized, or implemented, when the vehicle motor assembly is energized, such as responsive to actuation/energization of the vehicle motor assembly by the battery assembly. For example, the plurality of drive configurations may include one or more of the direction (forward or reverse) in which the vehicle drive assembly will propel the vehicle upon energization of the vehicle motor assembly, the relative speed or range of speed which the vehicle motor assembly is configured/energized to provide, and/or whether the vehicle drive assembly is able to be actuated responsive to an actuation input to a drive actuator 104.

For example, speed drive configurations, such as "high" and "low" speed configurations, "high," "medium," and "low" speed configurations, etc., may be selected with one or more user input devices 102 in the form of a speed switch 110. These speed drive configurations may be realized (i.e., the vehicle may be propelled according to the selected speed drive configuration) upon actuation or energization of the motor assembly. As the illustrative descriptions used above imply, the speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by a user input device in the form of a direction switch 112, which enables a user to select the relative direction (i.e., clockwise or counterclockwise) of rotation of output(s) 50 and thereby configure the vehicle to drive in forward and reverse directions upon energization of the vehicle motor assembly. Actuator 104, and switches 108, 110, and 112 (when present) may be located in any suitable location on body 12 and/or steering assembly 26. Preferably, the switches or other user input devices are positioned for actuation by a child sitting on seat 18. Illustrative (non-exclusive) examples of suitable positions are shown in FIG. 2. Illustrative, non-exclusive examples of combined speed and direction switches that take the form of shifters are disclosed in U.S. Pat. No. 5,644,114 and in U.S. patent application Ser. No. 11/410,568, the complete disclosures of which are hereby incorporated for reference for all purposes.

A further example of drive configurations may be referred to as power configurations and relate to whether or not the vehicle drive assembly's motor assembly is in an energized state, in which the vehicle motor assembly is driving the rotation of the driven wheel assembly, or a de-energized state, in which the vehicle motor assembly is not driving the rotation of the driven wheel assembly. In other words, when in the de-energized drive configuration, the vehicle motor assembly does not drive the rotation of the ride-on vehicle's driven wheel assembly. As an illustrative example, the vehicle drive assembly may be selectively configured from a de-energized drive configuration to an energized drive configuration responsive to a user, such as a child sitting on a seat of the ride-on vehicle, actuating drive actuator 104. As discussed, this may (but is not required in all embodiments to) include pressing or otherwise manipulating a throttle lever or button, or depressing a foot pedal.

The vehicle drive assembly may include any suitable structure to selectively enable the plurality of drive configurations. For example, switching between forward and reverse drive configurations may be implemented by reversing the polarity of the battery assembly relative to the motor assembly. As another example, relative speed configurations may be achieved by switching two or more batteries and/or two or more motors between series and parallel configurations. As a further example, gears or similar mechanical structures may be utilized to configure relative speed configurations. As yet another example, a microprocessor or other controller may enable the configurations via predetermined programming. Continuing this example, relative speed configurations may be achieved through pulse-width modulation or other duty cycle ramping of the energization of the motor assembly.

It is within the scope of the present disclosure that the plurality of drive configurations may include other configurations than the illustrative examples described herein. Similarly, the vehicle drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

As shown in FIG. 3, vehicle drive assembly 30 may (but is not required to) further include a controller 114, which controls the operation of the vehicle drive assembly responsive to at least one of received user inputs and predetermined programming. As an illustrative example, controller 114 may be adapted to control electronically the transmission of a user-selected speed to the driven wheel assembly and/or to configure the vehicle drive assembly to the user-selected drive configuration. Controller 114 may include a microprocessor or suitable control circuit. In the context of configuring the vehicle drive assembly to a selected drive configuration, the controller may be adapted to selectively enable or disable selected ones of the plurality of drive configurations responsive to user inputs, such as via user input devices 102, predetermined programming, and/or inputs from other sensors or switches.

When controller 114 is adapted to regulate the energization of the vehicle motor assembly, it may regulate electronically the rotational input transmitted by the vehicle motor assembly to the driven wheel assembly. For example, controller 114 may regulate at least one of the timing and the ramp, or rate, of application of the transmission of the rotational input after actuation of a corresponding user input device by a child sitting on seat 18. In other words, the controller may be configured to delay in at least time and/or rate of transmission the rotational input to the driven wheel assembly responsive at least in part to a user input selecting the desired, or selected, rotational input. An illustrative example of a suitable controller is disclosed in U.S. Pat. No. 6,771,034, the complete disclosure of which is hereby incorporated by reference for all purposes.

It is also within the scope of the present disclosure that controller 114 may selectively control the transmission of the selected rotation input (such as determined by the selected speed configuration and/or actuation input). By this it is meant that the controller may be configured to control the transmission of the selected rotational input in certain situations, such as when certain parameters or thresholds are satisfied. For example, controller 114 may regulate the transmission of rotational input only when the selected rotational input occurs when the ride-on vehicle is already being driven (such as during a user-selected change in speed or direction), when the ride-on vehicle is already traveling at more than a predetermined speed (actual or selected), or when the ride-on vehicle changes direction.

As shown in FIG. 2, body 12 also includes a battery compartment 120 that is adapted to receive battery assembly 60. The battery compartment may take any of a variety of different shapes, sizes, configurations, and locations depending on such factors as the form of vehicle 10, the portion of the vehicle's body within which the compartment is formed, and the size and shape of battery assembly 60.

Ride-on vehicle 10 also includes a powered window mechanism 130. A portion of the powered window mechanism is shown in FIGS. 1 and 2 and includes a movable window member 132 and a window actuator 134. The window actuator enables a child occupying seat assembly 16 to selectively move the window member relative to body 12. The window actuator may take any suitable form, such as a switch, a lever, a dial, and the like. The window actuator may be located within or near passenger compartment 14 so that a child sitting on seat assembly 16 may reach the actuator. For example, a window actuator, such as an on/off switch, may be located on the body as shown in FIGS. 1 and 2. Although a pair of window actuators are illustrated in FIG. 2 to accommodate a driver and a passenger, a single window actuator may be used.

Body 12 includes an opening 136 to accommodate movement of the window member relative to the body. For example, the window member may be configured to extend through the opening as the window member is actuated between a closed position and an open position. In some embodiments, this movement may be described as movement between a retracted configuration, in which the window member is at least partially, if not completely, positioned within the body of the ride-on, and an extended configuration, in which the window member extends from the body, such as through opening 136, to a greater extent than when the window member is in the retracted configuration. The window member may be positioned in any suitable location of the body, such as a window within a side door portion, a sunroof within an upper body portion, a rear window within a hatchback door portion, and the like. In some embodiments, the window member may replace a portion, or member, of the vehicle body, such as to allow a child to enter the vehicle or place items in the vehicle, including, but not limited to, a sliding door, a movable hatchback portion, a tailgate, and the like. In such embodiments, powered window mechanism 150 may be referred to as a powered body mechanism 150. The corresponding components thereof may be similarly referred to as components of the powered body mechanism. For example, window member 132, window drive assembly 140, window actuator 134, and window motor assembly 142 may respectively be referred to as movable body member 132, body member drive assembly 140, body member actuator 134, and body member motor assembly 142. The ride-on may include one or more window members, with the one or more window members actuated together by a single actuator 134 or actuated independently by an actuator for each window member. The window member may be formed from any suitable material, including, but not limited to, glass and plastics, and may (but is not required to) be clear or opaque.

Figure 5:
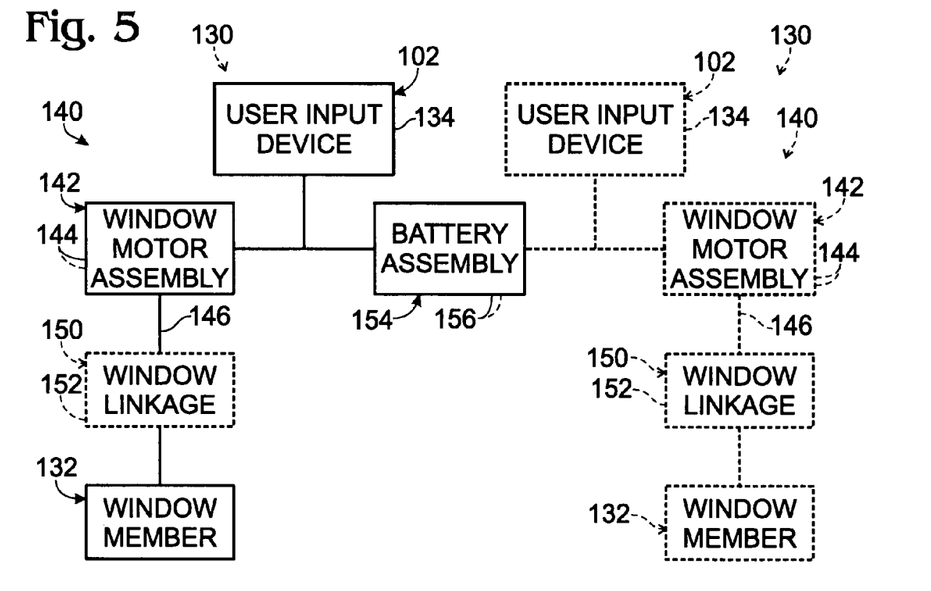
FIG. 5 is a schematic diagram of an illustrative example of a powered window mechanism of a children's ride-on vehicle.

As shown in FIG. 5, ride-on vehicle 10 may include one or more powered window mechanisms 130. For example, the ride-on vehicle may include a pair of powered window mechanisms, such as for a driver and passenger side window, a side window and a sunroof, and the like. It is further within the scope of the present disclosure that a ride-on vehicle 10 may include three or more powered window mechanisms 130, such as for two side windows and a sunroof or rear window. Movement of the window member is driven by window drive assembly 140. In other words, window actuator 134 is adapted to selectively energize the window motor assembly responsive to a user, such as a child sitting on the vehicle's seat, manipulating, or otherwise actuating, the input device. In FIG. 5, a non-exclusive example of a suitable window drive assembly 140 for a children's ride-on vehicle, such as vehicle 10, is schematically illustrated. Window drive assembly 140 is adapted to selectively drive movement of the window member relative to the body. The window member may be moved vertically, such as towards the top and bottom of the body, or horizontally, such as towards the front and back of the body, and/or configured to rotate relative to the body, such as to open and close a pivotable sunroof.

The window drive assembly 140 includes a window motor assembly 142, which includes at least one electric motor 144 that is adapted to drive movement of at least one window member 132. The window actuator is adapted to receive a user input directing a power source to actuate or otherwise energize the window motor assembly, such as to move the window member relative to the vehicle body. The window motor assembly includes an output 146 that is coupled to the window member to provide movement of the window member relative to the body of the vehicle. Although other constructions may be utilized, the output 146 from each of the one or more motors typically includes a rotating shaft and/or a rotation pinion or output gear. Output 146 may include more than one shaft, pinion, and/or gear, such as when window motor assembly 142 includes more than one motor.

In FIG. 5, window drive assembly 140 is shown further including an optional window linkage 150 adapted to couple the output of the window motor assembly to the window member. When present, the window linkage mechanically interconnects the window motor assembly with the window member. Window linkage 150 may include any suitable mechanism that transmits the rotational input from the window motor assembly's output(s) to the window member. Examples of suitable window linkages include an intermediate linkage between the window motor assembly output and the window member, such as a gearbox containing one or more gears, a worm gear, one or more individual gears, a belt or chain drive, one or more elastic members, and the like. The window linkage may be adapted to transmit the input from the window motor assembly to the window member at the same relative rate of rotation, or it may mechanically augment the input to convey a greater or lesser rate of movement relative to the rate of movement of the output of the window motor assembly. In some configurations of powered window mechanism 130, window drive assembly 140 may be formed without window linkage 150, in which case the output(s) 146 of the window motor assembly directly transmit the input to the window member.

When present, the window linkage may establish a fixed linkage between the output of the window motor assembly and the window member, such as by being secured to each of these components. It is also within the scope of the present disclosure that the window linkage, when present, may be releasably coupled between the output of the window motor assembly and the window member. By this it is meant that the window linkage may be selectively configured between an engaged configuration and a disengaged configuration. In the engaged configuration, the linkage couples the output of the window motor assembly and the window member together so that movement of the output results in movement of the window member. In the disengaged configuration, rotation or other movement of the output does not result in movement of the window member and/or the window member may move without a corresponding movement of the output.

When the window linkage is releasably coupled between the output of the motor assembly and the window member, the window linkage may be biased to maintain coupled motion of the output of the window motor assembly and the window member. This biasing may be accomplished with any suitable biasing mechanism or biasing member. In such a configuration, the window linkage may include, or be in communication with, an optional clutch assembly 152 that is adapted to selectively uncouple the output of the window motor assembly and the window member to permit relative movement of the motor output and the window member. The clutch assembly may be configured to uncouple the output of the window motor assembly and the window member responsive to a force that is applied to the clutch assembly that exceeds a predetermined threshold. For example, the clutch assembly may permit movement of the window member and the motor output to not be synchronized (i.e., to configure window linkage to a disengaged configuration) to limit potential damage to the powered window mechanism when forces are applied thereto that exceed a predetermined threshold. These forces may be encountered in such illustrative, non-exclusive situations as when the motor is still energized to move the window member but a child is pulling or pushing on the window member in an opposite direction or at a different rate and/or when the movement of the window member is obstructed but the window motor assembly is actuated to drive continued movement of the window member in the direction of the obstruction.

Figure 6:
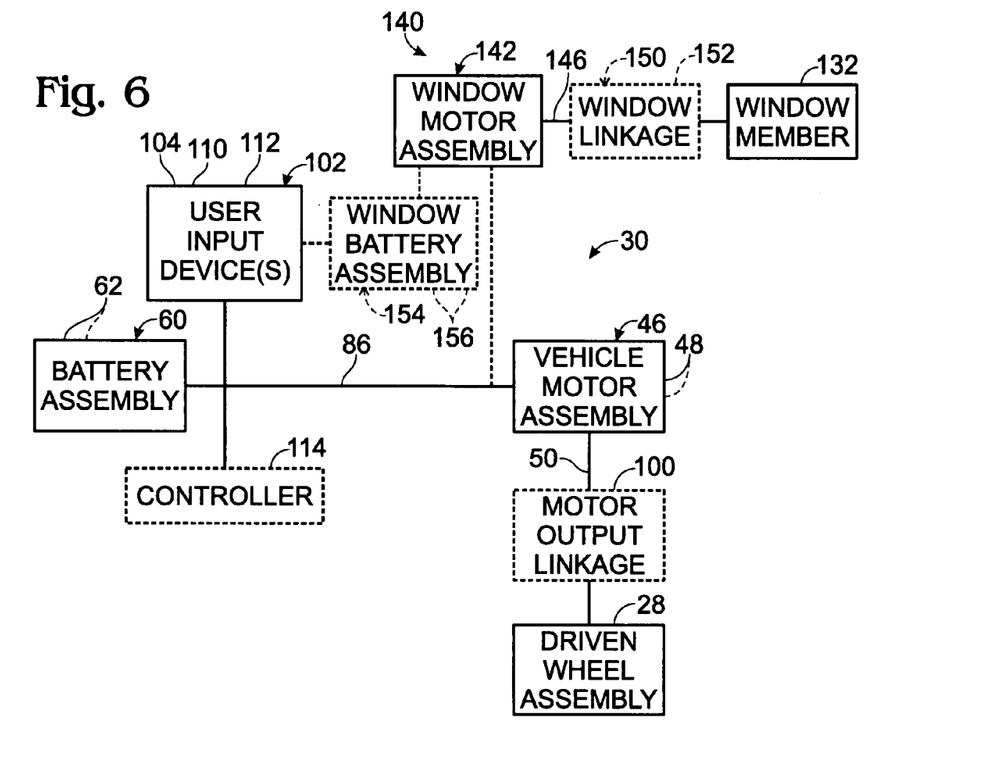
FIG. 6 is a schematic diagram of an illustrative example of a powered window mechanism of a children's ride-on vehicle combined with the vehicle drive assembly of FIG. 3.

Window drive assembly 140 may be battery powered. A battery assembly may be configured to selectively and independently energize the vehicle drive assembly and the window drive assembly. For example, the ride-on vehicle may include a window battery assembly 154 having one or more batteries 156, as shown in FIG. 5, to selectively energize the window motor assembly independently of the vehicle drive assembly and vehicle battery assembly 60. In some configurations, such as shown in FIG. 6, the window motor assembly may be powered by the same battery assembly 60 that is used to power the vehicle motor assembly. Although the powered window mechanism is shown with a battery-powered vehicle, the window mechanism could be configured for use with pedal-powered vehicles. Further, aspects of the disclosed window mechanism may be incorporated into a mechanical window opening device.

Figure 7:
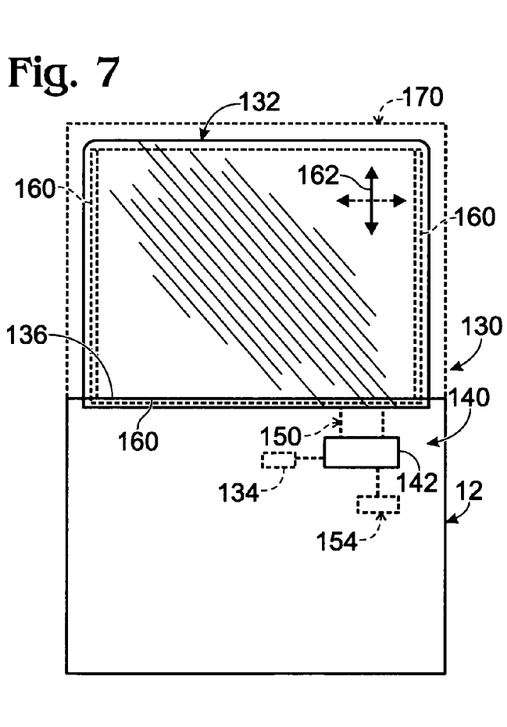
FIG. 7 is a schematic diagram of an illustrative example of a powered window mechanism including a window member and a window motor assembly.

FIG. 7 somewhat schematically depicts an illustrative, non-exclusive example of a powered window mechanism 130 in which a window member 132 is selectively movable relative to the vehicle body 12 through opening 136. Window drive assembly 140 drives movement of the window member in response to a user input to window actuator 134. Window drive assembly 140 includes a window motor assembly 142 that is energized selectively by actuator 134. Output of the motor assembly may be coupled to the window member by a window linkage 150. A window battery assembly 154 may be provided to energize the window motor assembly independently of the vehicle drive assembly and battery assembly 60. The body includes an opening 136, through which the window member extends at least when the window member is in its extended, or closed, configuration.

As illustrated in FIG. 7, the window member may include one or more receiving regions 160 that are adapted to couple the window member with the window linkage. The window linkage may be configured to sequentially engage segments of the one or more receiving regions. In some configurations, the window member further includes a second receiving region spaced apart from the first receiving region and the first and second receiving regions extend parallel to a path of travel 162 of the window member. The window member may be configured to move horizontally, vertically, and/or rotate relative to the vehicle body 12, such as responsive to actuation of the window motor assembly.

Window member 132 may include one or more window support assemblies 170 that guide movement of the window, maintain the orientation of the window relative to the body, and/or conceal one or more of the powered window mechanism components. For example, window support assembly 170 may support one or more edges of the window member, may conceal receiving regions 160, and/or may maintain the orientation of the window member relative to body 12, such as when only a single receiving region is used to move the window member.

Figure 8:
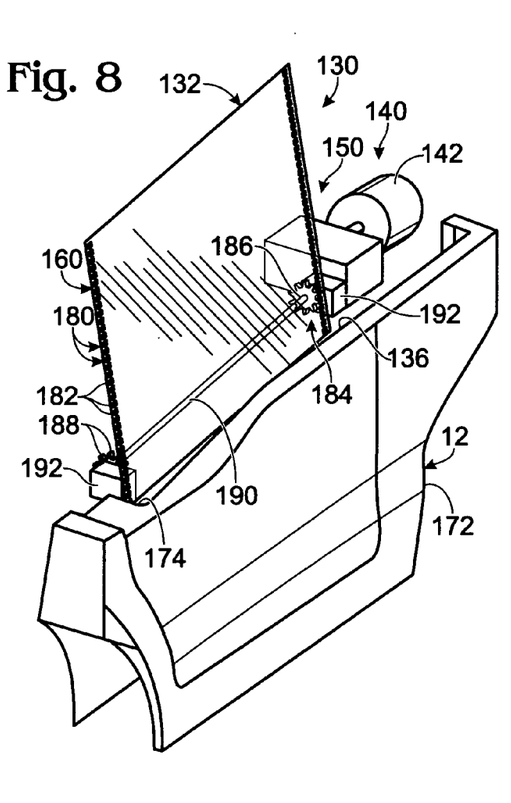
FIG. 8 is an exterior perspective view of an illustrative example of a powered window mechanism of a children's ride-on vehicle according to the present disclosure, in which the window member is moved relative to the vehicle body by gears.

In the illustrative, non-exclusive example of a powered window mechanism shown in FIG. 8, body 12 includes a door portion 172 in which opening 136 is formed. The window member is movable relative to a door portion, such as by moving vertically relative to the door portion. The door portion may include a door frame, such as which may be formed by one or more side supports, and in some embodiments may include an upper support. The door portion may be movable relative to the rest of the body or may be integrally formed with the body such that the door portion does not open. Window support assembly 170 may take the form of guide channels, or grooves, 174 within the door portion that wrap around the receiving regions and support the window member. The door portion may extend around the edges of the window member, such as to support the sides and top of the window member and/or conceal receiving regions 160 when the window member is in a closed position.

Figure 9:
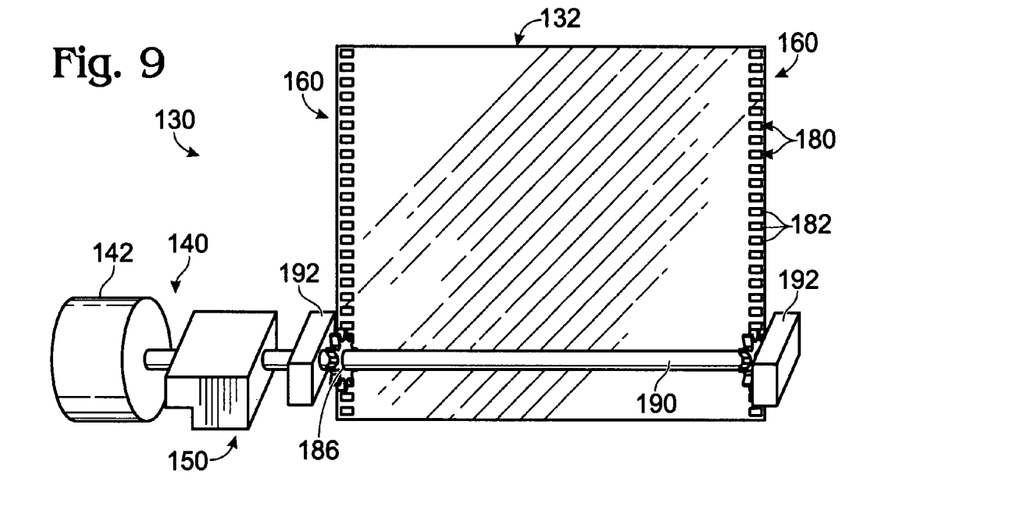
FIG. 9 is a fragmentary interior view of the powered window mechanism of FIG. 8.

In the illustrative, non-exclusive example shown in FIG. 8, the window motor assembly 142 is mounted on the interior of the vehicle's body 12 below opening 136. This relative mounting position is an illustrative example, and other positions may be used without departing from the scope of the present disclosure. Window motor assembly 142 is coupled to window linkage 150, which includes a gear assembly 184. The window member includes parallel receiving regions 160 on opposing edges of the window member. The receiving regions include a plurality of spaced-apart segments 180 that are configured to couple the window member with the window linkage. In the illustrative configuration of FIGS. 8 and 9, the segments take the form of apertures 182. As shown, gear assembly 184 includes a pair of gears 186 having sprockets 188 that are adapted to engage the receiving regions and translate the window member relative to the body responsive to rotation of the gears. The sprocket gears are coupled to the motor assembly output by an axle 190. In such a configuration, the apertures are configured to sequentially receive the sprockets and translate the window member relative to the body responsive to rotation of the gears. Rotation of the sprockets in one direction will urge the window member to move generally away from the vehicle body, such as through opening 136, while rotation of the sprockets in the opposite direction will retract the window member toward the body. Powered window mechanism 130 may include additional components, such as one or more bearings 192. In the exemplary powered window mechanism of FIGS. 8 and 9, bearings 192 take the form of pillow block bearings, which may be mounted to body 12 to provide load support for axle 190.

Figures 10, 11:
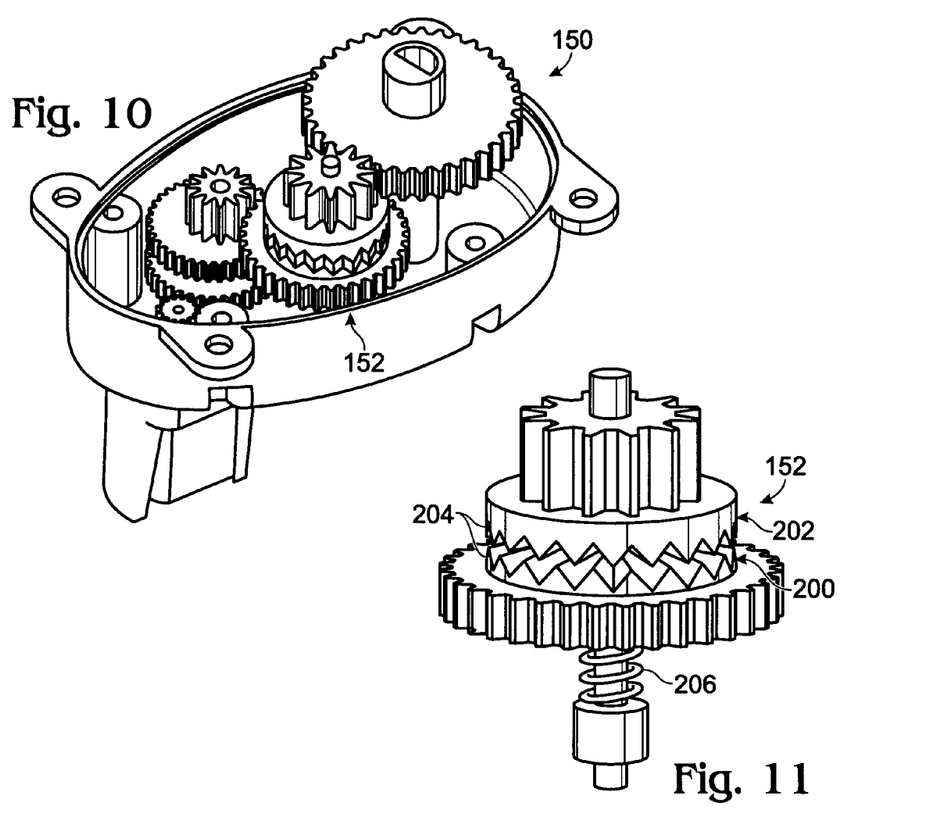
FIG. 10 is a perspective view of an illustrative example of a window linkage suitable for coupling of a window motor output and the window member, such as for the powered window mechanism of FIGS. 5-9.
FIG. 11 is a perspective view of an illustrative example of a clutch assembly suitable for use with the window linkage of FIG. 10.

As previously discussed, the window linkage may be biased to maintain coupled motion of the output of the window motor assembly and the window member. In such a configuration, the window linkage may include clutch assembly 152 that is adapted to selectively uncouple the output of the window motor assembly and the window member to permit relative movement of the motor output and the window member, such as by converting rotation of the motor output to linear movement of the window member. For example, the window linkage 150, such as that of the illustrative linkage shown in FIGS. 8 and 9, may include clutch assembly 152. FIGS. 10 and 11 illustrate an illustrative, non-exclusive example of a suitable clutch assembly for use with the window linkage. As illustrated in FIG. 11, a first clutch member 200 engages a second clutch member 202 via protrusions 204, such as matching teeth on each clutch member. One or more of the clutch members may be biased to engage one another. For example, a biasing mechanism in the form of a spring 206 may urge the first clutch member to engage the second clutch member to maintain synchronized movement of the clutch members, and consequently the synchronized movement of the motor output and the window member. Other biasing members and/or mechanisms may be utilized. The clutch assembly may be configured to uncouple the output of the window motor assembly and the window member responsive to a force exceeding a predetermined threshold. For example, the first clutch member may compress the spring to disengage the first clutch member from the second clutch member in response to a force exceeding a predetermined threshold, such as a child pushing or pulling on the window member, or the window member being otherwise obstructed.

Figure 12:
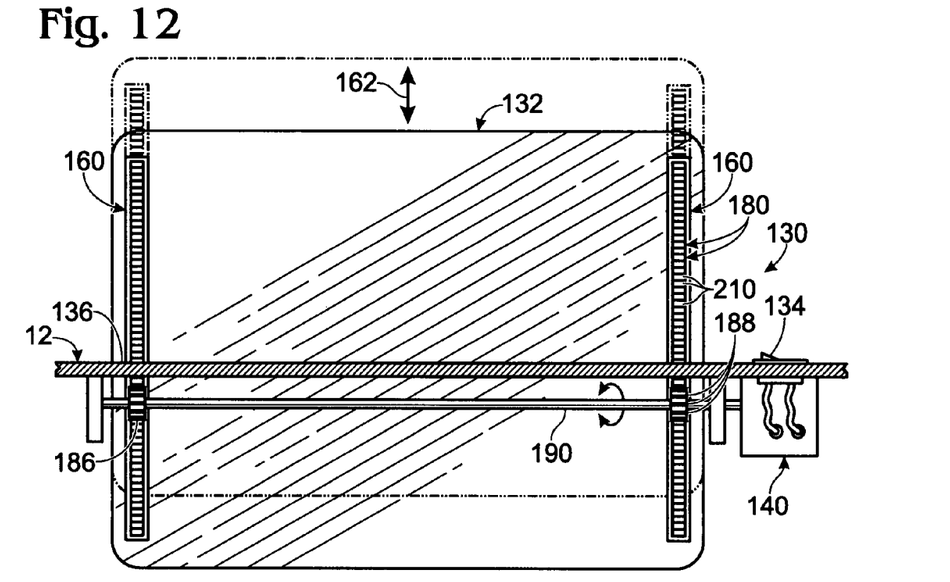
FIG. 12 is an interior view of another illustrative example of a powered window mechanism of a children's ride-on vehicle according to the present disclosure, in which the window member is moved by a rack and pinion system between a closed position and an open position.

FIG. 12 illustrates another exemplary powered window mechanism 130. As depicted, body 12 includes an opening 136, such as in a door portion. A pair of receiving regions 160 extend along opposing sides of the window member 132. A window drive assembly 140 is mounted to the body, such as to a door frame, with a window actuator 134, such as a toggle switch, adjacent the opening. The window drive assembly includes a window linkage with a pair of gears 186 that are rotated by axle 190. The gears include sprockets 188 that may be configured to engage the receiving regions and translate the window member relative to the body responsive to rotation of the gear. In such a configuration, the receiving region includes a plurality of spaced-apart segments 180 configured to sequentially engage with the sprockets and translate the window member relative to the body responsive to rotation of the gear. As shown, the segments may take the form of ribs or teeth 210, such as along a ribbed plate or toothed rack as is used for rack and pinion systems. Ribs 210 may be integrally formed with the window pane or may be coupled to the window pane using any suitable fastener, including, but not limited to, screws, glues, tapes, clips, and the like. In some configurations, the receiving regions may be perforated or toothed belts that operatively couple the window member and the gears.

Figure 13:
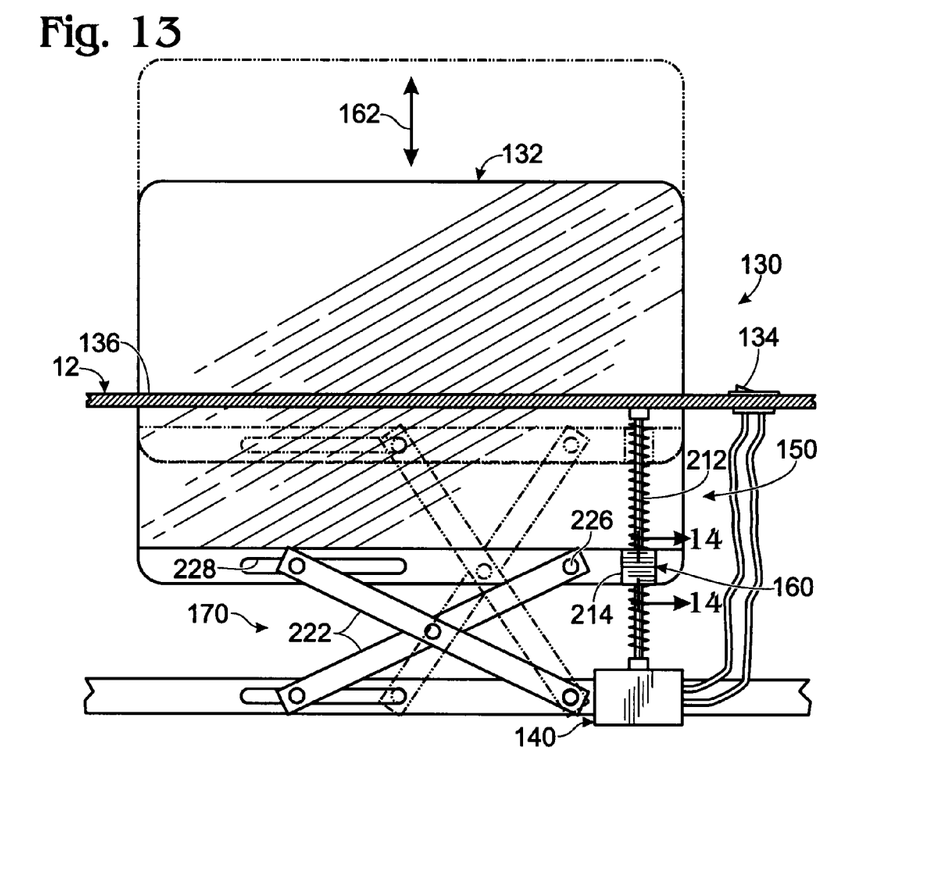
FIG. 13 is an interior view of another illustrative example of a powered window mechanism of a children's ride-on vehicle according to the present disclosure, in which the window member is moved relative to the vehicle body by a threaded shaft.
Figure 14:
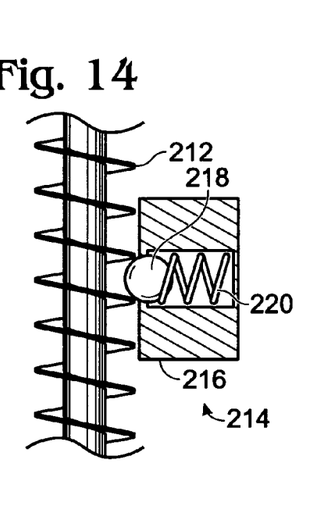
FIG. 14 is a side view of an illustrative example of a clutch assembly suitable for use with the powered window mechanism of FIG. 13 in which a bearing assembly is biased to engage the threads of the shaft.

FIG. 13 illustrates another illustrative, non-exclusive example of a powered window mechanism 130. As depicted, the window linkage 150 includes a threaded shaft 212, such as a worm gear. The receiving region 160 of the window member includes a bearing assembly 214 configured to engage with and translate relative to the threaded shaft and thereby translate the window member relative to the body responsive to rotation of the threaded shaft. The bearing assembly may be selectively coupled to the window member or may be integrally formed with the window member. FIG. 14 illustrates an exemplary bearing assembly 214 suitable for use with the powered window mechanism of FIG. 13. As depicted, the bearing assembly includes a housing 216 and a bearing 218 that is biased to engage the threaded shaft, such as by a spring 220. The spring biases the bearing to maintain contact with the threads of shaft 212. The housing is coupled to the window member, such as at the bottom or back side of the window member, and may extend around the threaded shaft or may engage a side portion of the threaded shaft, such as in the exemplary configuration of FIG. 14.

FIG. 13 further illustrates an illustrative, non-exclusive example of a window support assembly 170 that is adapted to maintain the window member in a predetermined orientation relative to the body. For example, the window support assembly may include one or more rotatable members 222 having a first end coupled to the body and a second end coupled to the window member. To support the rotatable members, one end may be coupled in a fixed location, such as by a pin joint 226, while the second end is movably coupled, such as by a pin and slot 228. As the window member is moved between an open, or raised, position and a closed, or lowered, position, the rotatable members provide structural support to maintain the window member in a predetermined orientation, such as may be desirable when a single window drive assembly is associated with the window member and offset from the center of the window member. The window support assembly may further include guide channels 174, as previously described, to support the sides of the window member.

Figure 15:
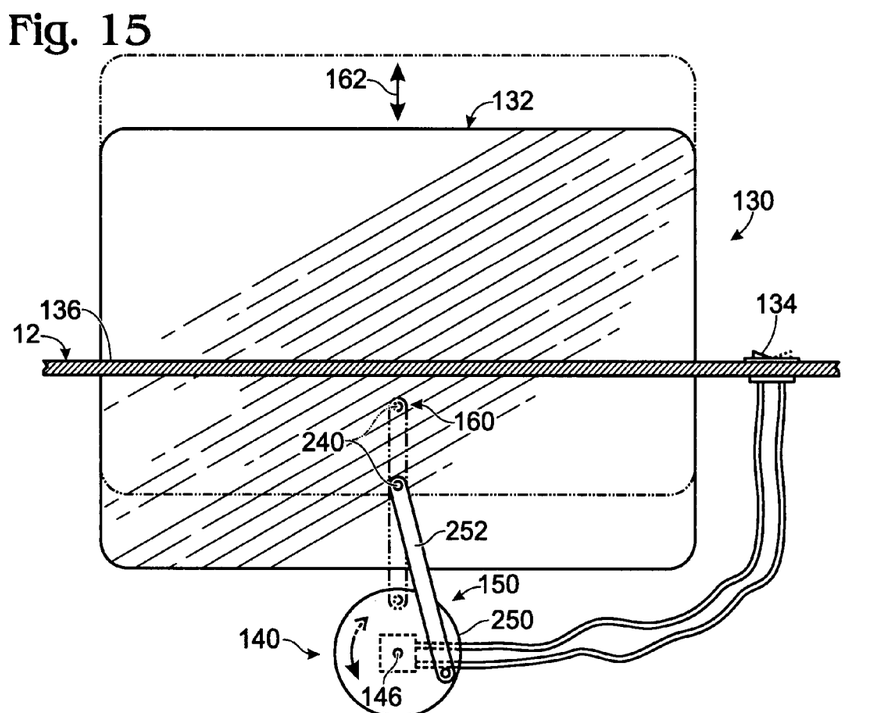
FIG. 15 is an interior view of another illustrative example of a powered window mechanism of a children's ride-on vehicle according to the present disclosure, in which the window member is moved relative to the vehicle body by a rotating disk.

Another illustrative, non-exclusive example of a powered window mechanism 130 according to the present disclosure is shown in FIG. 15. The window drive assembly 140 may be mounted on the interior of the vehicle's body 12 below opening 136. This relative mounting position is an illustrative example, and other positions may be used without departing from the scope of the present disclosure. The window motor assembly output 146 may be coupled to the window member by a window linkage 150. As depicted, the window member may include one or more receiving regions 160 that are adapted to couple the window member 132 with the window linkage. For example, the receiving region may take the form of a pin joint 240 or other suitable component(s) configured to permit relative rotation with the window linkage. The window linkage may include a rotating member, such as is illustrated in the form of a disk, 250 and a transmission member 252, such as a rod, that couple the motor output with the window member. The transmission member may be coupled to the disk or other rotating member using any suitable mechanism, including, but not limited to, frictionless components, bearings, pin joints, hinges, and the like.

As shown, the motor output 146 rotates the disk 250 to move the transmission member 252 such that one end of the rod moves along a path defined by the rotational movement of the disk (or other rotating member) and where this end is coupled to the disk, while the opposing end of the rod urges the window member to move relative to the vehicle body along the path of travel 162. As illustrated in FIG. 15, the rotational movement of disk 250 causes the window member to sequentially be raised and lowered (or otherwise reciprocated) along its path of travel. In such a configuration, the window motor assembly may include one or more single-direction motors, as the rotation of the motor (and/or its motor output) does not need to be reversed to cause the window to reverse its direction of movement. However, it is also within the scope of the present disclosure that a reversible motor may be used, as reversing the direction or rotation of the motor and/or its motor output may also be used to cause the window member to reverse its movement along its path of travel. This optional use of a reversible motor is indicated in dashed lines in FIG. 15.

The open, or raised, and the closed, or lowered, positions of the window member may be achieved without significant user precision in operating the window actuator 134. A child may therefore alter the position of the window member by manipulating the actuator in a single manner, such as by depressing a button for a given time period, rather than manipulating an actuator having multiple positions, such as up, down, and neutral/stop. The powered window mechanism may include a window support assembly, as previously described, as is necessary or desired to support and maintain the orientation of the window member 132. The window linkage may include a clutch assembly adapted to selectively uncouple the output of the window motor assembly and the window member to permit relative movement of the motor output and the window member. For example, a clutch assembly may be configured to uncouple the output of the window motor assembly and the disk or window member responsive to a force exceeding a predetermined threshold.

Figure 16:
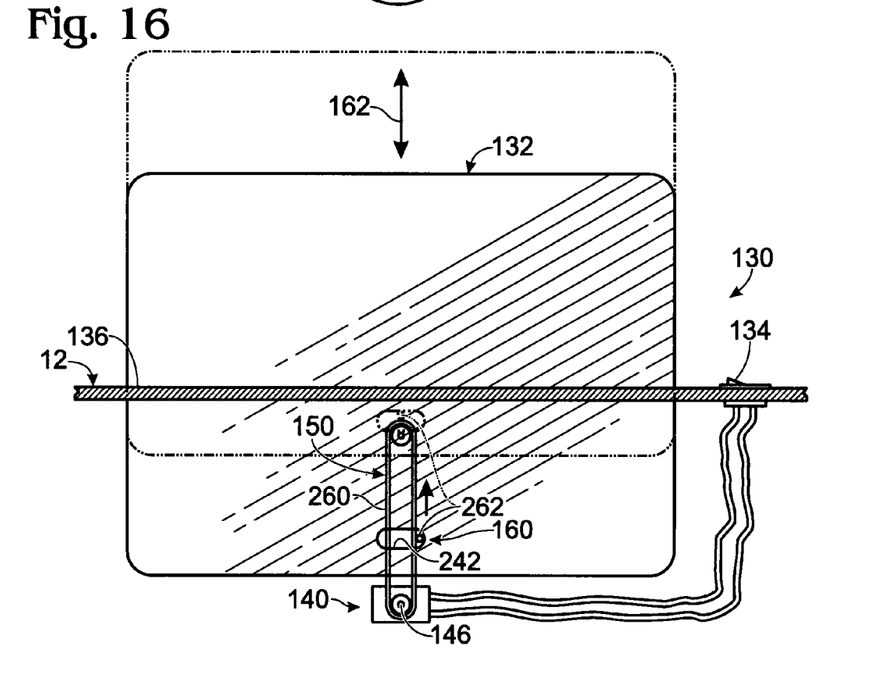
FIG. 16 is an interior view of another illustrative example of a powered window mechanism of a children's ride-on vehicle according to the present disclosure, in which the window member is moved relative to the vehicle by a belt.

FIG. 16 depicts another illustrative, non-exclusive example of a powered window mechanism 130 according to the present disclosure. The powered window mechanism shown in FIG. 16 provides another example of a powered window mechanism that may be driven with a reversible motor or with a single-direction motor and yet still drive the window member to move in a reciprocating manner along its path of travel. Similar to the preceding embodiment, the window drive assembly 140 may be mounted on the interior of the vehicle's body 12 below opening 136, although other positions may be used without departing from the scope of the present disclosure. The window motor assembly output 146 may be coupled to the window member by a window linkage 150. As illustrated, the window member may include one or more receiving regions 160 that are adapted to couple the window member with the window linkage. For example, the receiving region may take the form of an elongate slot 242 or other suitable engagement region that is configured to receive a portion of the window linkage. As another illustrative example, the receiving region may take the form of an elongate track, channel, or race.

The window linkage may include a belt 260 that couples the rotation of the motor output with the window member to translate the rotational movement of the motor output to reciprocating movement of the window member along path of travel 162. The belt may be formed of any suitable material, may be rigid or elastic, and may be formed from a single length of material or may be formed from a plurality of interconnected links or segments. As shown, the belt may include a protrusion 262 that projects or otherwise extends from the belt and is configured to engage the slot and thereby urge the window member between the open and closed positions. Protrusion 262 may take any suitable form for engaging with the engagement region of the window member in a manner that permits the protrusion to move in a reciprocating path relative to the engagement region, while remaining coupled to the engagement region, as the belt is rotated by the window motor assembly. The protrusion may extend into or through the slot or other engagement region or otherwise be coupled thereto to provide the above-discussed movement.

For example, in the version shown in FIG. 16, the protrusion may engage the right side of the slot as the belt is rotated counter-clockwise to move the window member to a closed position. Upon reaching the closed position (i.e., the highest point of the belt), the protrusion moves to the left side of the slot and urges the window member towards the open position by pressing down on the lower edge of the slot. In the illustrated embodiment, the relative movement of the protrusion in a direction that is generally transverse to the path of travel of the window member provides a period in which the window motor assembly is driving the rotation of belt 260 and yet the window member is not being urged along its path of travel. Such a construction may permit a child to more easily position the window member in its open or closed position without having to carefully stop the rotation of the window motor assembly at a precise time.

As discussed, the window motor assembly may include one or more single-direction motors. Optionally, a reversible motor also may be used to drive the movement of the window member along its path of travel. The powered window mechanism may include a window support assembly, as previously described, as is necessary or desirable to support and maintain the orientation of the window member 132. The window linkage may include a clutch assembly adapted to selectively uncouple the output of the window motor assembly and the window member to permit relative movement of the motor output and the window member.

It should be appreciated that the window mechanisms disclosed herein may take any suitable configuration. For example, the window drive assembly may be mounted to either the body or the window member. Further, the powered window mechanism may be configured to operate the window along any suitable path of travel. While illustrative examples of ride-on vehicles with powered window mechanisms according to the present disclosure have been illustrated and described herein, the powered window mechanisms may take a wide variety of other forms, as desired or beneficial for a particular application, without departing from the scope of the present disclosure.

INDUSTRIAL APPLICABILITY

The present disclosure is applicable to children's ride-on vehicles.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations of features, functions, elements and/or properties that may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A children's ride-on vehicle, comprising:
    a body having at least one seat sized for a child, wherein the body includes a window member selectively movable relative to the body;
    a plurality of wheels rotatably coupled to the body and including at least one steerable wheel and at least one driven wheel;
    a steering assembly comprising a steering mechanism adapted to receive steering inputs from a child sitting on the at least one seat, and a steering linkage adapted to convey the steering inputs to the at least one steerable wheel;
    a battery-powered vehicle drive assembly adapted to selectively drive the rotation of the at least one driven wheel in response to inputs from a child sitting on the at least one seat; and
    a battery-powered window drive assembly adapted to selectively move the window member relative to the body, wherein the window drive assembly comprises:
        a window motor assembly comprising at least one electric motor having an output,
        a user input device positioned to receive inputs from a child sitting on the at least one seat and adapted to selectively actuate the window motor assembly, and
        a window linkage adapted to couple the output of the window motor assembly with the window member, wherein the window member includes at least a first receiving region adapted to couple the window linkage with the window member;
    wherein the first receiving region includes a slot configured to receive a portion of the window linkage;
    wherein the window linkage includes a belt having a protrusion configured to engage the slot and translate the window member relative to the body responsive to movement of the belt;
    wherein as the belt rotates, the protrusion sequentially engages a first side of the slot to move the window to a closed position and a second side of the slot to move the window to an open position.

2. The children's ride-on vehicle of claim 1, wherein the at least one electric motor is a single-direction motor, and wherein the window linkage is configured to rotate the belt in one of clockwise or counter-clockwise.

3. The children's ride-on vehicle of claim 1, wherein the at least one electric motor is a reversible motor, and wherein the window linkage is configured to selectively rotate the belt clockwise and counter-clockwise.

4. The children's ride-on vehicle of claim 1, wherein the window linkage is biased to maintain coupling of the output of the window motor assembly and the window member.

5. The children's ride-on vehicle of claim 4, wherein the window linkage comprises a clutch assembly adapted to selectively uncouple the output of the window motor assembly and the window member to permit relative movement of the motor output and the window member.

6. The children's ride-on vehicle of claim 5, wherein the clutch assembly is adapted to uncouple the output of the window motor assembly and the window member responsive to a force exceeding a predetermined threshold.

7. The children's ride-on vehicle of claim 1, further comprising a window support assembly adapted to maintain the window member in a predetermined orientation relative to the body.

8. The children's ride-on vehicle of claim 1, wherein the window drive assembly further comprises a window battery assembly including at least one battery adapted to selectively energize the window motor assembly.

9. A children's ride-on vehicle, comprising:
a body having at least one seat sized for a child, wherein the body includes a window member adapted to move relative to the body;
a plurality of wheels rotatably coupled to the body and including at least one steerable wheel and at least one driven wheel;
a steering assembly comprising a steering mechanism adapted to receive steering inputs from a child sitting on the at least one seat, and a steering linkage adapted to convey the steering inputs to the at least one steerable wheel;
a vehicle drive assembly adapted to selectively drive the rotation of the at least one driven wheel, wherein the vehicle drive assembly comprises:
a vehicle motor assembly comprising at least one electric motor, and
at least a first user input device positioned to receive inputs from a child sitting on the at least one seat and adapted to selectively actuate the vehicle motor assembly; and
a window drive assembly adapted to selectively drive movement of the window member relative to the body, the window drive assembly comprising:
a window motor assembly comprising at least one electric motor having an output, and
a window linkage adapted to couple the output of the window motor assembly to the window member;
wherein the window member includes a receiving region coupled to the window linkage;
wherein the receiving region includes a slot configured to receive a portion of the window linkage;
wherein the window linkage includes a belt having a protrusion configured to engage the slot and translate the window member relative to the body responsive to movement of the belt;
wherein as the belt rotates, the protrusion sequentially engages a first side of the slot to move the window to a closed position and a second side of the slot to move the window to an open position.

10. The children's ride-on vehicle of claim 9, wherein the at least one electric motor is a single-direction motor, and wherein the window linkage is configured to rotate the belt in one of clockwise or counter-clockwise.

11. The children's ride-on vehicle of claim 9, wherein the at least one electric motor is a reversible motor, and wherein the window linkage is configured to selectively rotate the belt clockwise and counter-clockwise.

12. The children's ride-on vehicle of claim 9, wherein the body includes an opening and the window member is configured to extend through the opening.

13. The children's ride-on vehicle of claim 12, wherein the body includes a door portion and the opening is formed in the door portion.

14. The children's ride-on vehicle of claim 9, wherein the vehicle drive assembly further comprises a vehicle battery assembly including at least one battery adapted to selectively energize the vehicle motor assembly, and further wherein the window drive assembly further comprises a window battery assembly including at least one battery adapted to selectively energize the window motor assembly.

15. The children's ride-on vehicle of claim 9, further comprising a battery assembly adapted to selectively and independently energize the vehicle drive assembly and the window drive assembly.

16. The children's ride-on vehicle of claim 9, wherein the window linkage is biased to maintain coupling of the output of the window motor assembly and the window member.

17. The children's ride-on vehicle of claim 16, wherein the window linkage comprises a clutch assembly adapted to selectively uncouple the output of the window motor assembly and the window member to permit relative movement of the motor output and the window member.

18. The children's ride-on vehicle of claim 17, wherein the clutch assembly is adapted to uncouple the output of the window motor assembly and the window member responsive to a force exceeding a predetermined threshold.

19. The children's ride-on vehicle of claim 9, further comprising a window support assembly adapted to maintain the window member in a predetermined orientation relative to the body.

20. The children's ride-on vehicle of claim 19, wherein the window support assembly is integrally formed with the body.

21. A children's ride-on vehicle, comprising:
a body having at least one seat sized for a child, wherein the body includes a window member selectively movable relative to the body, wherein the window member includes at least one slot;
a plurality of wheels rotatably coupled to the body and including at least one steerable wheel and at least one driven wheel;
a steering assembly comprising a steering mechanism adapted to receive steering inputs from a child sitting on the at least one seat, and a steering linkage adapted to convey the steering inputs to the at least one steerable wheel;
a battery-powered vehicle drive assembly adapted to selectively drive the rotation of the at least one driven wheel in response to inputs from a child sitting on the at least one seat; and
a battery-powered window drive assembly adapted to selectively move the window member relative to the body, wherein the window drive assembly comprises:
a window motor assembly comprising at least one electric motor having an output;
a user input device positioned to receive inputs from a child sitting on the at least one seat and adapted to selectively actuate the window motor assembly; and
a window linkage adapted to couple the output of the window motor assembly with the window member, wherein the window linkage includes a belt having a protrusion configured to engage the slot of the window member and to translate the window relative to the body responsive to movement of the belt;
wherein:
as the belt rotates counter-clockwise, the protrusion engages a right side of the slot to move the window to a closed position, and the protrusion engages a left side of the slot to move the window to an open position; and/or
as the belt rotates clockwise, the protrusion engages a left side of the slot to move the window to a closed position, and the protrusion engages a right side of the slot to move the window to an open position.

22. A children's ride-on vehicle, comprising:
a body having at least one seat sized for a child, wherein the body includes a window member selectively movable relative to the body;

a plurality of wheels rotatably coupled to the body and including at least one steerable wheel and at least one driven wheel;

a steering assembly comprising a steering mechanism adapted to receive steering inputs from a child sitting on the at least one seat, and a steering linkage adapted to convey the steering inputs to the at least one steerable wheel;

a battery-powered vehicle drive assembly adapted to selectively drive the rotation of the at least one driven wheel in response to inputs from a child sitting on the at least one seat; and a battery-powered window drive assembly adapted to selectively move the window member relative to the body, wherein the window drive assembly comprises:
- a window motor assembly comprising at least one electric motor having an output;
- a user input device positioned to receive inputs from a child sitting on the at least one seat and adapted to selectively actuate the window motor assembly; and
- a window linkage adapted to couple the output of the window motor assembly with the window member;

wherein when the at least one electric motor rotates in a single direction, the window will sequentially open and close.

23. The children's ride-on vehicle of claim 22, wherein the at least one electric motor is a single-direction motor.

24. The children's ride-on vehicle of claim 22, wherein the at least one electric motor is a reversible motor.

25. The children's ride-on vehicle of claim 22, wherein the window linkage is biased to maintain coupling of the output of the window motor assembly and the window member.

26. The children's ride-on vehicle of claim 25, wherein the window linkage comprises a clutch assembly adapted to selectively uncouple the output of the window motor assembly and the window member to permit relative movement of the motor output and the window member.

27. The children's ride-on vehicle of claim 26, wherein the clutch assembly is adapted to uncouple the output of the window motor assembly and the window member responsive to a force exceeding a predetermined threshold.

28. The children's ride-on vehicle of claim 22, further comprising a battery assembly adapted to selectively and independently energize the vehicle drive assembly and the window drive assembly.

29. The children's ride-on vehicle of claim 22, wherein the vehicle drive assembly further comprises a vehicle battery assembly including at least one battery adapted to selectively energize the vehicle motor assembly, and further wherein the window drive assembly further comprises a window battery assembly including at least one battery adapted to selectively energize the window motor assembly.

* * * * *